(12) United States Patent
Fang et al.

(10) Patent No.: US 12,523,880 B1
(45) Date of Patent: Jan. 13, 2026

(54) HEAD-MOUNTED VR DEVICE

(71) Applicant: Shenzhen Youban Zhihui Technology Limited, Guangdong (CN)

(72) Inventors: Jinhong Fang, Guangdong (CN); Minliang Ruan, Guangdong (CN); Chuxin Zhang, Guangdong (CN)

(73) Assignee: Shenzhen Youban Zhihui Technology Limited, Shenzhen (CN)

( * ) Notice: Subject to any disclaimer, the term of this patent is extended or adjusted under 35 U.S.C. 154(b) by 0 days.

(21) Appl. No.: 19/258,951

(22) Filed: Jul. 3, 2025

(30) Foreign Application Priority Data

May 23, 2025 (CN) .......................... 202521038857.2

(51) Int. Cl.
*G02B 27/01* (2006.01)
(52) U.S. Cl.
CPC ................... *G02B 27/0176* (2013.01)
(58) Field of Classification Search
CPC .................................................. G02B 27/0176

USPC .......................................... 359/630; 345/7–9
See application file for complete search history.

(56) References Cited

U.S. PATENT DOCUMENTS

2021/0385954 A1* 12/2021 Chang .................. H05K 5/0217

\* cited by examiner

*Primary Examiner* — William Choi

(57) ABSTRACT

A head-mounted VR device includes a main housing and a flexible cushion that are connected to each other. A cavity is provided inside the main housing, a ventilating fan is provided inside the cavity, and a first through hole and second through holes are formed in inner and outer sides of the main housing respectively and communicate with the cavity. Third through holes are formed in the flexible cushion and are arranged in correspondence to and communicate with the second through holes, and the flexible cushion is used for contact with human skin. In this application, the ventilating fan introduces external airflow into the cavity through the first through hole, and directly directs cool air to contact areas between the flexible cushion and forehead, face and the like of a user through the second through holes and the third through holes.

18 Claims, 12 Drawing Sheets

HEAD-MOUNTED VR DEVICE

CROSS-REFERENCE TO RELATED APPLICATIONS

This application claims priority to Chinese Patent Application No. 202521038857.2, filed on May 23, 2025, the entire content of which is hereby incorporated by reference.

TECHNICAL FIELD

This application relates to the technical field of VR devices, and in particular, to a head-mounted VR device.

BACKGROUND

With the popularization of VR (Virtual Reality) technology, users have put forward higher demands on the wearing comfort of VR devices. Existing head-mounted VR devices often cause stuffiness, sweating and other problems when worn for a long time, which seriously affects the user experience. For this reason, it is necessary to incorporate appropriate heat dissipation structures in the head-mounted VR devices. Traditional heat dissipation solutions have several defects, for example: (1) a breathable fabric is provided on the contact surface of the headband. In order to prevent a user from feeling stuffy, the breathable fabric is provided on a side, being in contact with the forehead of the user, of a forehead band, such as wrapping elastic material with the breathable fabric. The elastic material can reduce the pressure on the forehead band, and the breathable fabric can aid in heat dissipation from the skin in the contact area of the forehead band. However, the heat dissipation of breathable fabric still relies on passive heat dissipation, which is limited in heat dissipation effect and cannot meet the heat dissipation needs of high-power consumption VR devices. (2) Corresponding upper and lower air outlet channels are designed. Airflow from the upper and lower air outlet channels can cool the upper forehead and face, but the area of the forehead band in contact with the skin still cannot receive adequate cooling, resulting in poor heat dissipation effect.

SUMMARY

The technical problem to be solved by this application is to provide a head-mounted VR device, so as to solve the problem of poor heat dissipation effect in existing head-mounted VR devices.

In order to solve the above technical problem, a technical solution adopted by this application is: A head-mounted VR device, including a main housing and a flexible cushion that are connected to each other, where a cavity is provided inside the main housing, a ventilating fan is provided inside the cavity, and a first through hole and second through holes are formed in inner and outer sides of the main housing respectively and communicate with the cavity; and third through holes are formed in the flexible cushion and are arranged in correspondence to and communicate with the second through holes, and the flexible cushion is used for contact with human skin.

In one or more embodiments, the main housing includes a first housing and a second housing that are connected to each other, and the first housing and the second housing define the cavity.

In one or more embodiments, a first assembly gap is provided between the top of the first housing and the top of the second housing to form a first air outlet channel that communicates with the cavity.

In one or more embodiments, a second assembly gap is provided between the bottom of the first housing and the bottom of the second housing to form a second air outlet channel that communicates with the cavity.

In one or more embodiments, the second housing includes a first housing portion, a second housing portion, and a third housing portion that are snap-fit sequentially, and the second through holes are formed in the first housing portion, the second housing portion, and the third housing portion.

In one or more embodiments, the head-mounted VR device further includes an outer housing, where an air inlet that communicates with the first through hole is formed in the outer housing, and an air grille is provided in the air inlet.

In one or more embodiments, a slot is formed in the main housing, and the outer housing is snapped in the slot; and/or, the air grille includes a horizontal grille and a vertical grille.

In one or more embodiments, the flexible cushion includes an elastic breathable layer and an outer covering layer, where the third through holes are provided in the elastic breathable layer, the outer covering layer covers the elastic breathable layer, and the outer covering layer is used for contact with human skin.

In one or more embodiments, the flexible cushion is detachably connected to the main housing.

In one or more embodiments, the flexible cushion is magnetically connected to the main housing.

The beneficial effect of this application lies in that: This application provides a head-mounted VR device with a heat dissipation structure, which achieves direct airflow cooling by arranging a ventilating fan and a multi-layer through-hole structure in the main housing and the flexible cushion. In practical application, the ventilating fan introduces external airflow into the cavity through the first through hole, and directly directs cool air to contact areas between the flexible cushion (i.e., the forehead band) and the forehead, face and the like of a user through the corresponding communication design of the cavity, the second through holes, and the third through holes. This efficiently enables direct cooling of the contact areas between the forehead band and the forehead, face and the like of the user, thereby reducing the feeling of stuffiness and improving the heat dissipation efficiency, breathability, and wearing comfort.

DETAILED DESCRIPTION OF THE EMBODIMENTS

Figure 1:
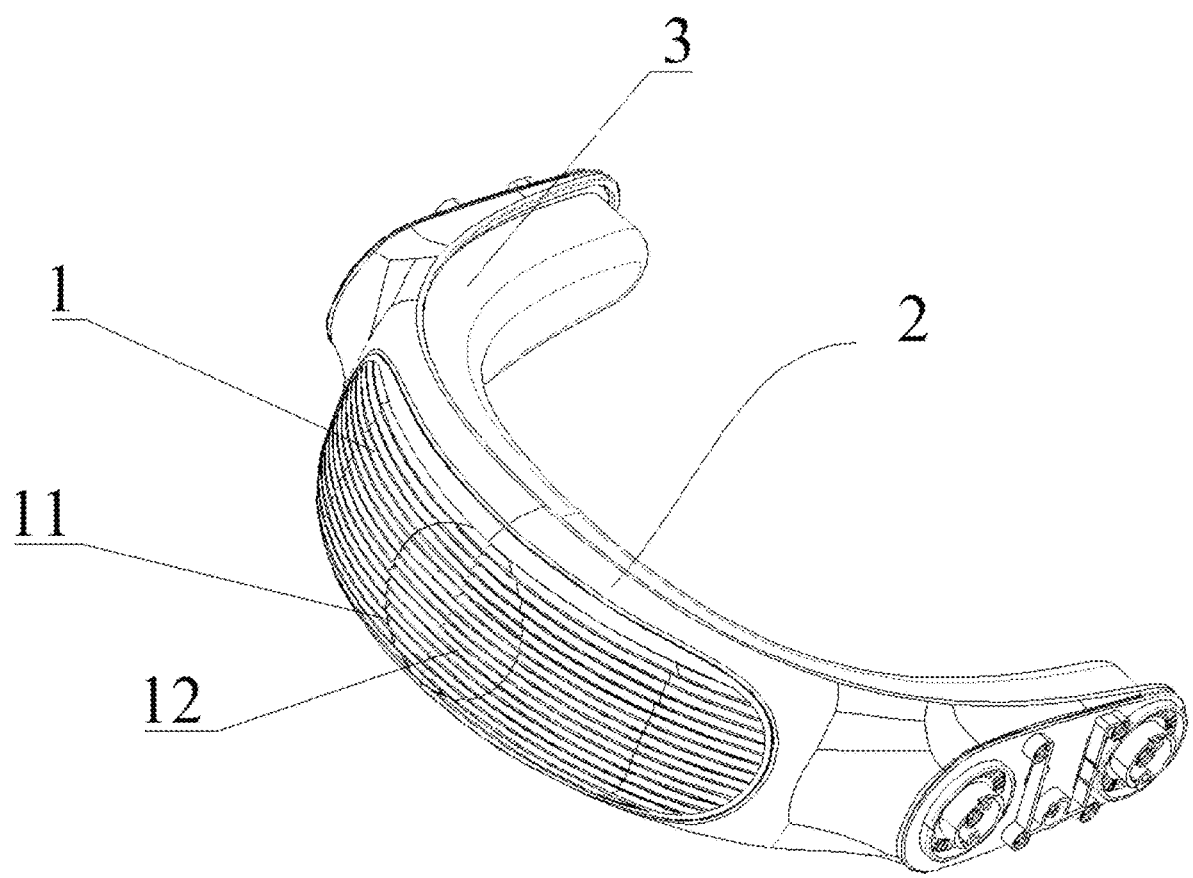
FIG. 1 is a schematic structural diagram of a head-mounted VR device described in this application from a perspective of one implementation.

In order to illustrate in detail the technical contents, achieved purposes and effects of this application, the following is described in conjunction with the implementations and with the accompanying drawings.

Referring to FIGS. 1 to 13, this application provides a head-mounted VR device. The head-mounted VR device includes a main housing 2 and a flexible cushion 3 that are connected to each other. A cavity 21 is provided inside the main housing 2, a ventilating fan 4 is provided inside the cavity 21, and a first through hole 23 and second through holes 26 are formed in inner and outer sides of the main housing 2 respectively and communicate with the cavity 21. Third through holes 31 are formed in the flexible cushion 3 and are arranged in correspondence to and communicate with the second through holes 26, and the flexible cushion 3 is used for contact with human skin.

As can be seen from the above description, the beneficial effect of this application lies in that: This application provides a head-mounted VR device with a heat dissipation structure, which achieves active cooling by arranging a ventilating fan 4 and a multi-layer through-hole structure in the main housing 2 and the flexible cushion 3. In practical application, the ventilating fan 4 introduces external airflow into the cavity 21 through the first through hole 23, and directly directs cool air to contact areas between the flexible cushion (i.e., the forehead band) and the forehead, face and the like of a user through the corresponding communication design of the cavity 21, the second through holes 26, and the third through holes 31. This efficiently enables direct cooling of the contact areas between the forehead band and the forehead and face of the user, thereby reducing the feeling of stuffiness and improving the heat dissipation efficiency, breathability, and wearing comfort.

Figure 11:
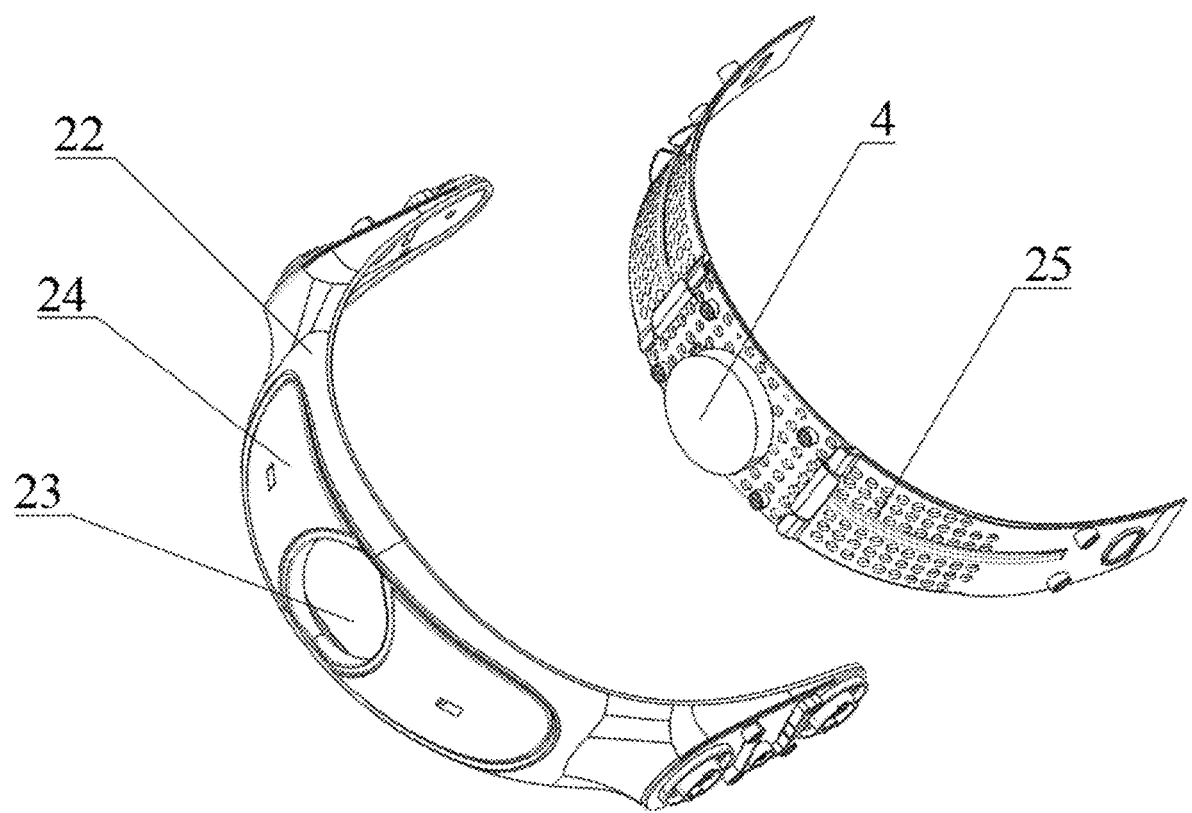
FIG. 11 is an exploded structural view of a main housing in a head-mounted VR device described in this application from a perspective of one implementation.
Figure 12:
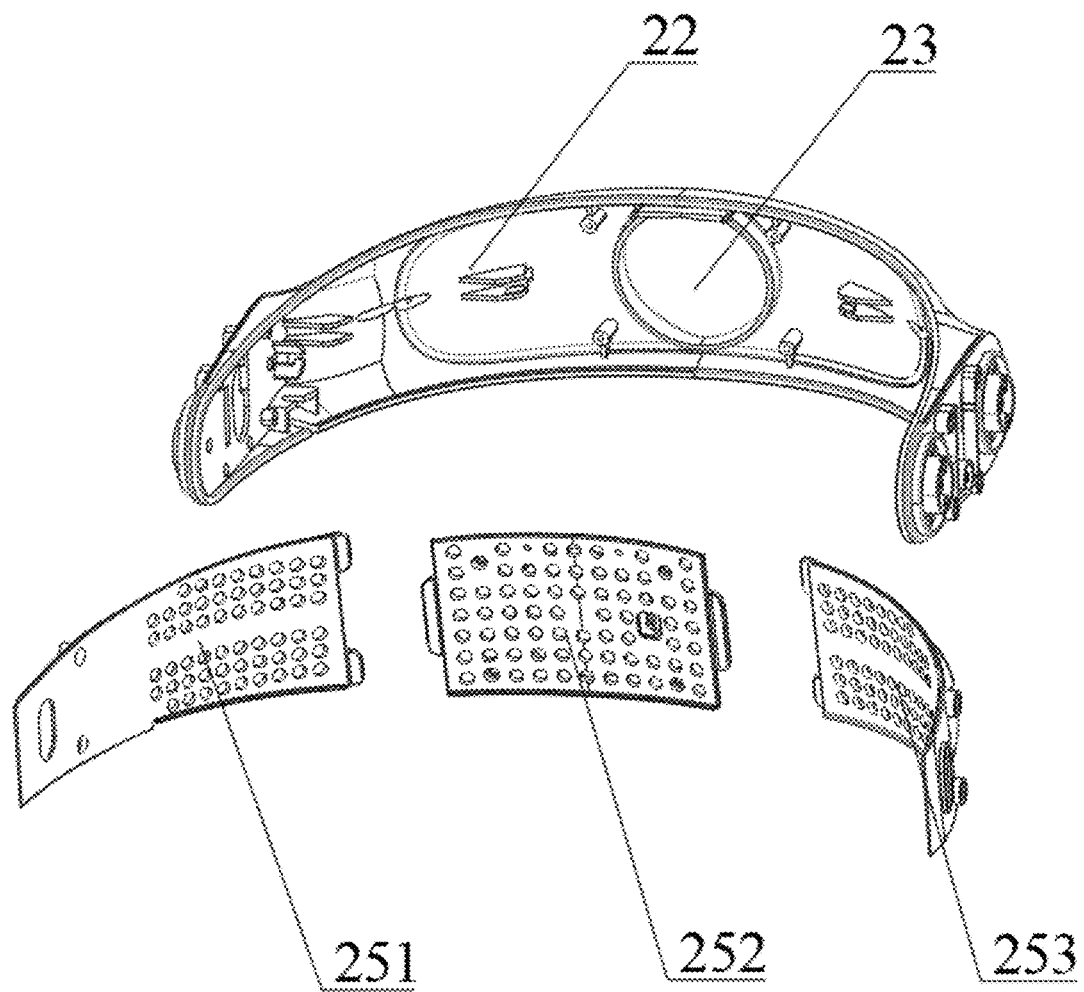
FIG. 12 is an exploded structural view of a main housing in a head-mounted VR device described in this application from another perspective of one implementation.

In one or more embodiments, as shown in FIGS. 11 and 12, the main housing 2 includes a first housing 22 and a second housing 25 that are connected to each other. The first housing 22 and the second housing 25 define the cavity 21.

As can be seen from the above description, the main housing 2 is divided into a first housing 22 and a second housing 25, simplifying the processing and assembly process of the cavity 21 through a split design. In practical application, the cavity 21 is elongated, which facilitates a more uniform cooling of the contact areas such as the forehead, and the face of the user. Definitely, in some implementations, the main housing 2 may be configured as a one-piece design.

Figure 6:
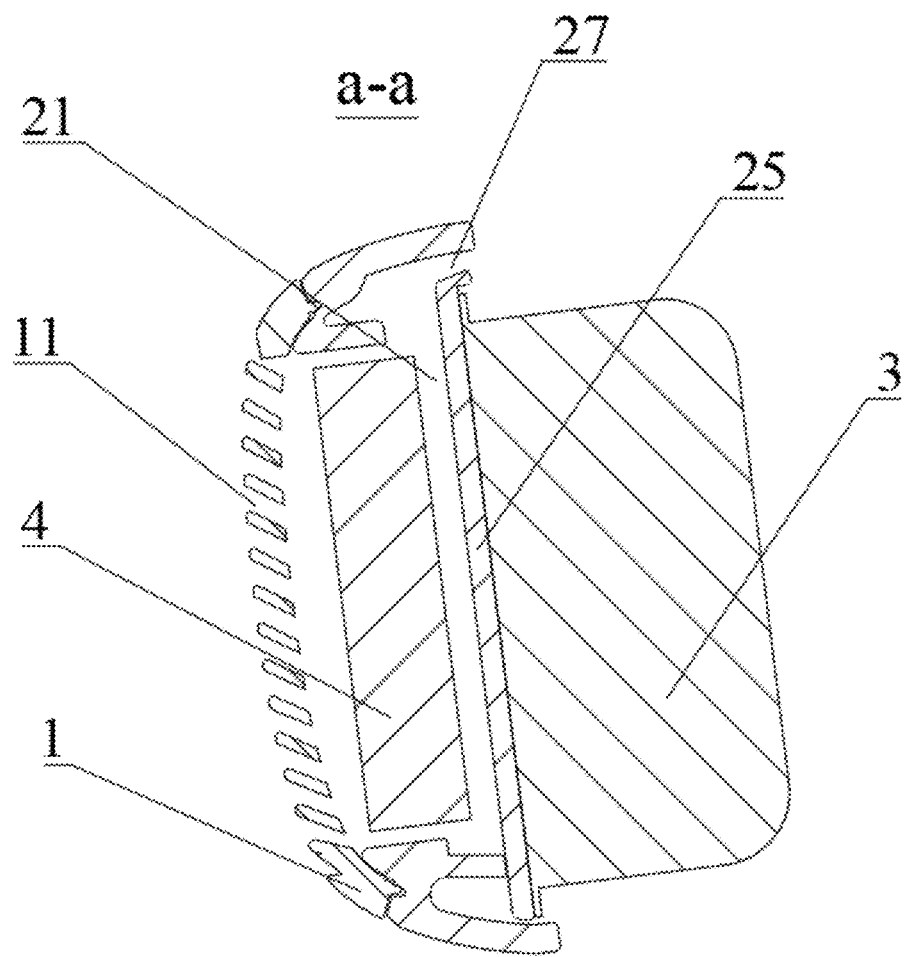
FIG. 6 is a schematic diagram of a-a section of the head-mounted VR device shown in FIG. 5.
Figure 7:
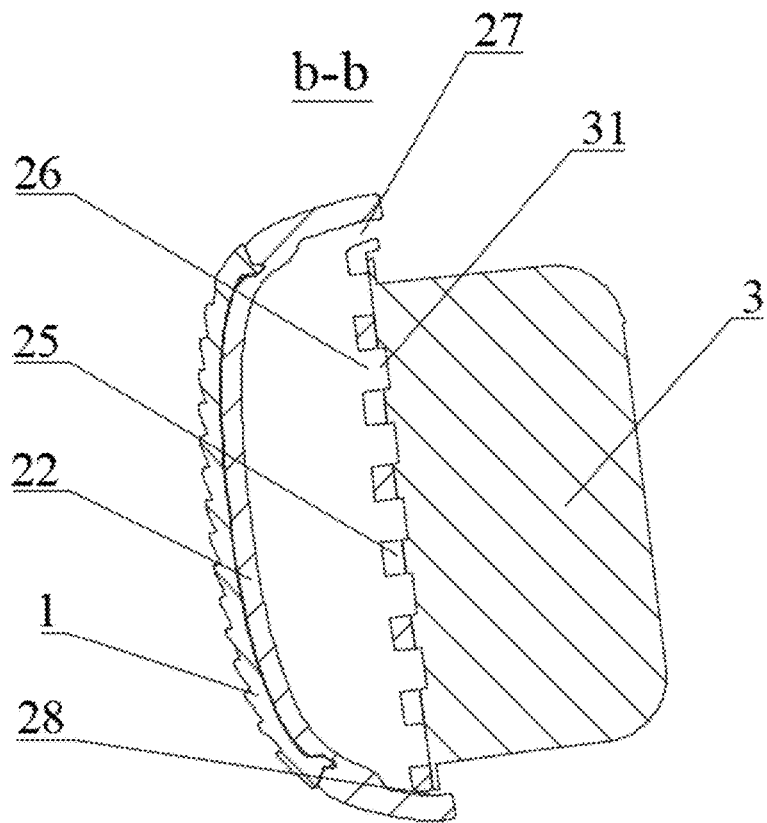
FIG. 7 is a schematic diagram of b-b section of the head-mounted VR device shown in FIG. 5.
Figure 8:
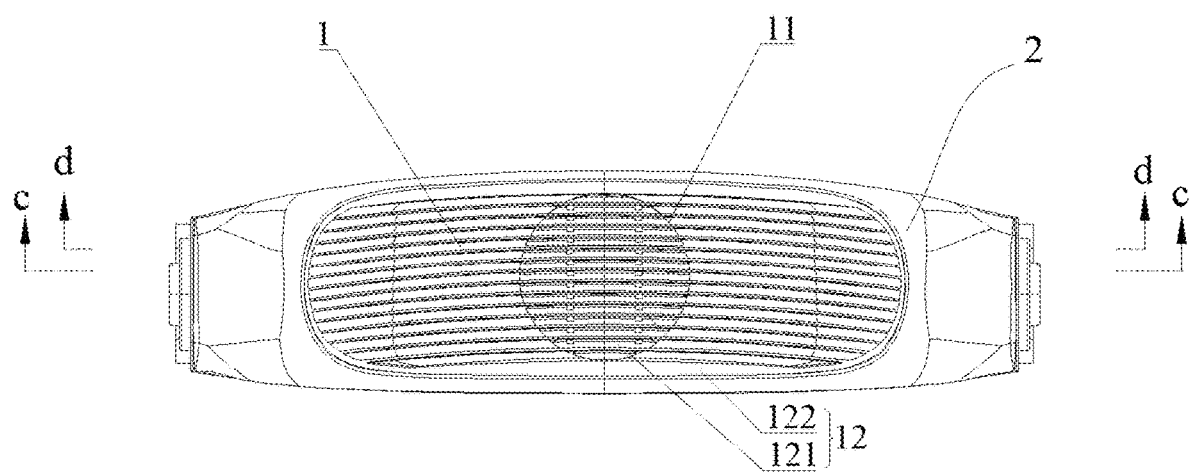
FIG. 8 is a main view of a head-mounted VR device described in this application.
Figure 9:
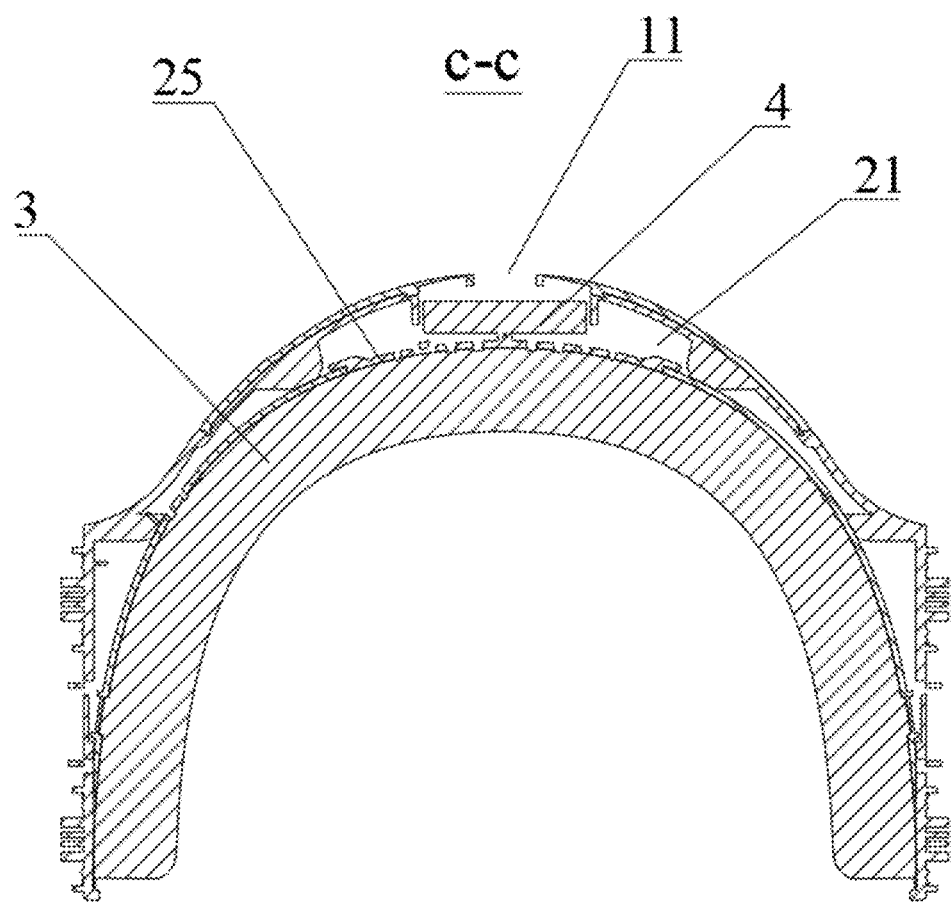
FIG. 9 is a schematic diagram of c-c section of the head-mounted VR device shown in FIG. 8.
Figure 10:
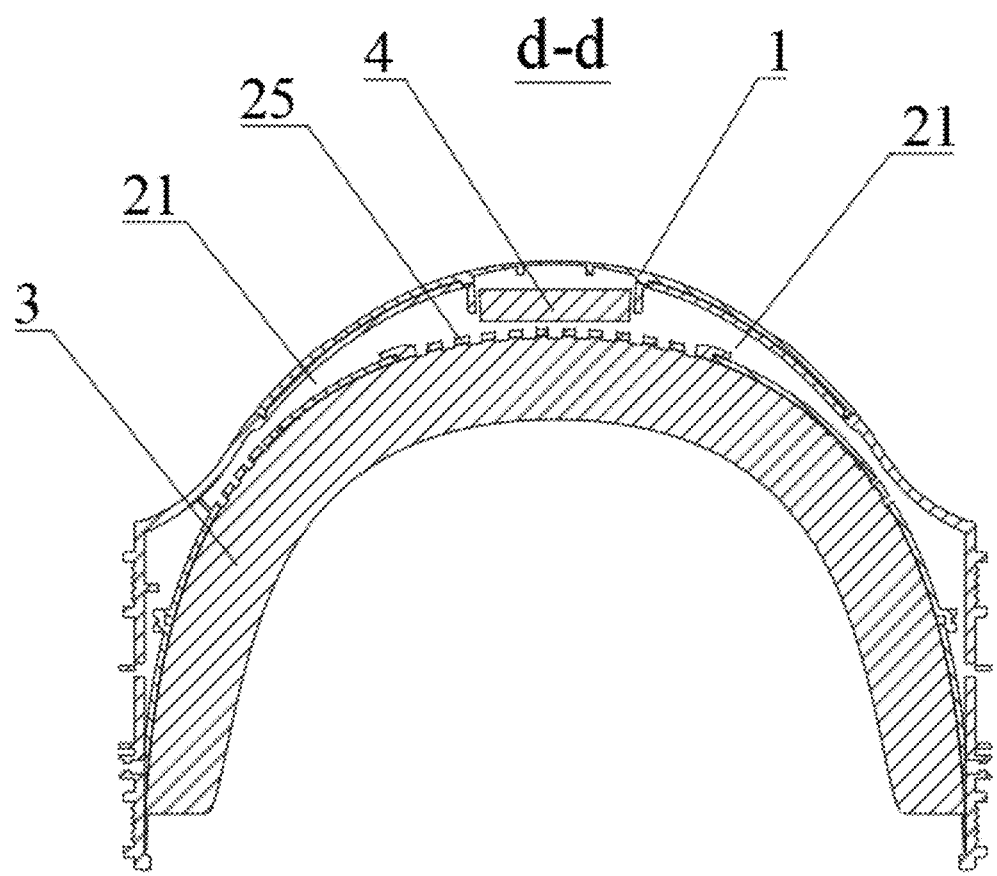
FIG. 10 is a schematic diagram of d-d section of the head-mounted VR device shown in FIG. 8.

In one or more embodiments, as shown in FIGS. 6 and 7, a first assembly gap is provided between the top of the first housing 22 and the top of the second housing 25 to form a first air outlet channel 27 that communicates with the cavity 21.

The first assembly gap serves as the first air outlet channel 27, which helps reduce the machining and assembly precision requirements of the main housing 2. In practice application, the first assembly gap is located at a side of the forehead band facing the top of the head. In this way, the air blown by the ventilating fan 4 can go upward (toward the forehead) through the cavity 21 and dissipate heat from the forehead through the first air outlet channel 27.

As can be seen from the above description, the first air outlet channel 27 is formed between the top of the first housing 22 and the top of the second housing 25, allowing the airflow to be evenly distributed across the forehead area of the user and avoiding localized overheating. This design can effectively enhance heat dissipation in key areas of the forehead.

In one or more embodiments, as shown in FIGS. 6 and 7, a second assembly gap is provided between the bottom of the first housing 22 and the bottom of the second housing 25 to form a second air outlet channel 28 that communicates with the cavity 21.

The second assembly gap serves as the second air outlet channel 28, which helps reduce the machining and assembly precision requirements of the main housing 2. In practice application, the second assembly gap is located at a side of the forehead band facing the face of the user. In this way, the air blown by the ventilating fan 4 can go downward (toward the face) through the cavity 21 and dissipate heat from the face through the second air outlet channel 28.

As can be seen from the above description, the provision of the second air outlet channel 28 between the bottom of the first housing 22 and the bottom of the second housing 25 further extends the coverage area of the airflow, allowing cool air to simultaneously act on the forehead and the lower face area. In summary, the design of the dual upper and lower air outlet channels achieves three-dimensional heat dissipation, enhances the heat dissipation effect, and solves the problem of uneven cooling caused by relying only on a single air outlet path.

In one or more embodiments, as shown in FIG. 12, the second housing 25 includes a first housing portion 251, a second housing portion 252, and a third housing portion 253 that are snap-fit sequentially. The second through holes 26 are formed in the first housing portion 251, the second housing portion 252, and the third housing portion 253.

In practice application, the ventilating fan 4 is mounted on the second housing portion 252, and extends from the second housing portion 252 into the first through hole 23.

As can be seen from the above description, the second housing 25 adopts a three-section snap-fit design (i.e., the first housing portion 251, the second housing portion 252, and the third housing portion 253), with each housing portion independently provided with the second through holes 26. This design enables airflow to be uniformly directed from the cavity 21 of the main housing 2 through a plurality of sectioned second through holes 26, covering a wider heat dissipation area. This design prevents localized airflow concentration or dead zone problem caused by a traditional single through hole, thereby improving the uniformity and effectiveness of heat dissipation significantly.

Figure 3:
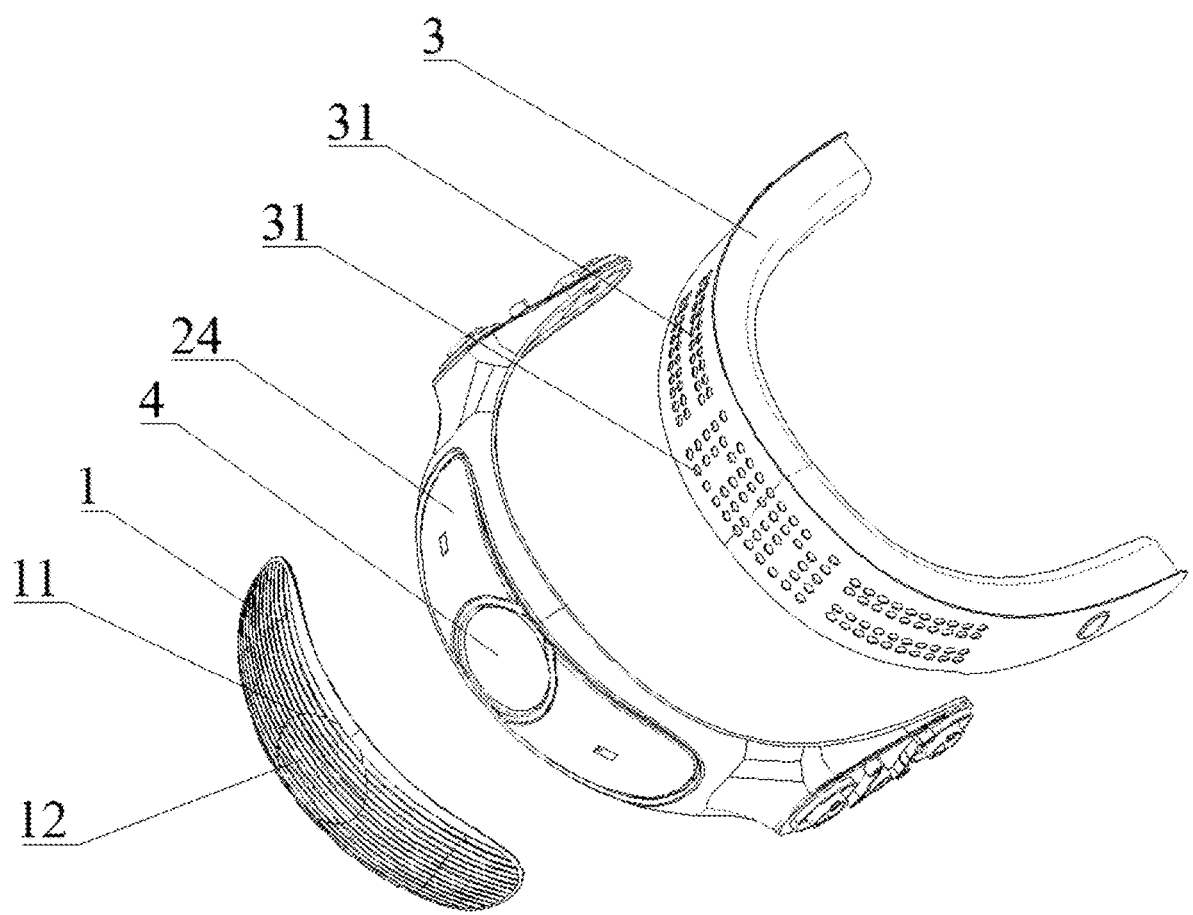
FIG. 3 is an exploded structural view of a head-mounted VR device described in this application from a perspective of one implementation.
Figure 4:
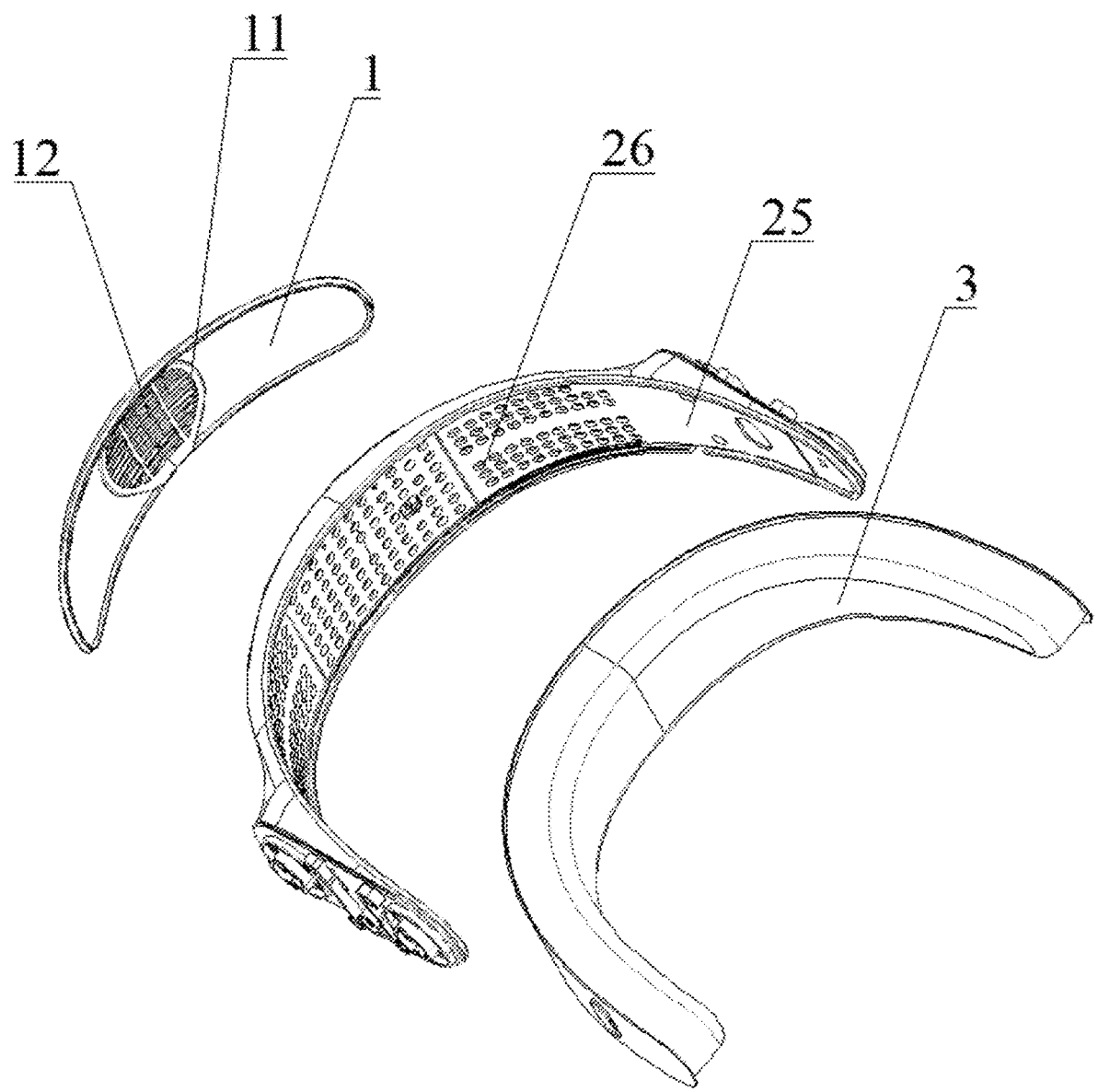
FIG. 4 is an exploded structural view of a head-mounted VR device described in this application from another perspective of one implementation.
Figure 5:
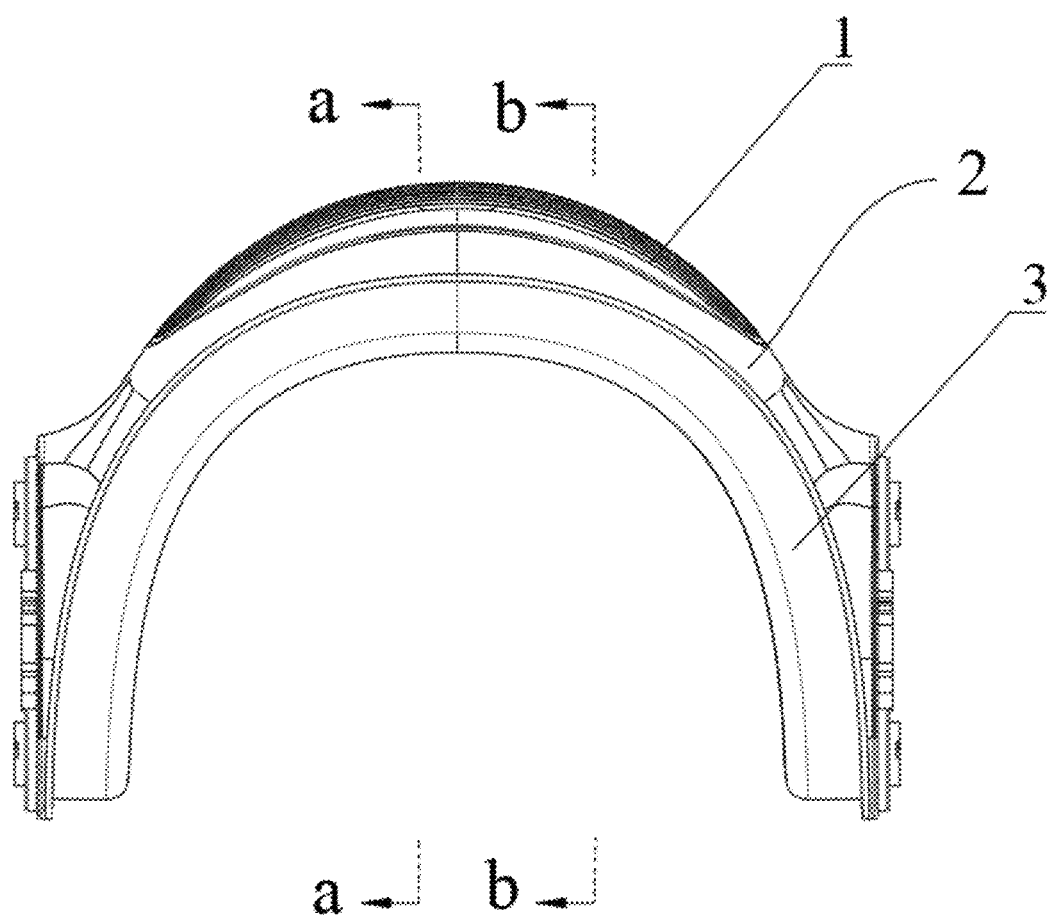
FIG. 5 is a top view of a head-mounted VR device described in this application.

In one or more embodiments, as shown in FIGS. 1 and 3, the head-mounted VR device further includes an outer housing 1. An air inlet 11 that communicates with the first through hole is formed in the outer housing 1, and an air grille 12 is provided in the air inlet 11.

In practice application, the air inlet may be designed in various shapes, such as a mesh or a louver. It is to be noted that the specific installation position of the ventilating fan 4 can be determined according to the actual situation. For example, the ventilating fan 4 may be fixedly mounted on the main housing 2 or on the outer housing 1, which is not limited herein.

As can be seen from the above description, the corresponding and communicating air inlet 11 is provided in the outer housing 1, allowing the external air to be directed into the first through hole 23 and then into the cavity 21 through the air inlet 11. In addition, the provision of the air grille 12 in the air inlet 11 can effectively block external foreign matter (such as hair) from entering the cavity 21, thereby preventing the ventilating fan 4 from being clogged or damaged.

In one or more embodiments, as shown in FIGS. 3 and 11, a slot 24 is formed in the main housing 2, and the outer housing 1 is snapped in the slot 24.

As can be seen from the above description, the slot 24 is formed in the main housing 2, and the outer housing 1 is fixed in the slot 24 in a snap-fit manner. This simplifies the assembly process of the outer housing 1 and the main housing 2, and improves the connection stability of the two.

In one or more embodiments, as shown in FIGS. 3 and 11, the air grille 12 includes a horizontal grille 121 and a vertical grille 122.

As can be seen from the above description, the air inlet 11 is provided with the air grille 12 including the horizontal grille 121 and the vertical grille 122, which effectively blocks external foreign matter from entering the cavity 21 and prevents the ventilating fan 4 from being clogged or damaged.

In one or more embodiments, the flexible cushion includes an elastic breathable layer 32 and an outer covering layer 33. The third through holes 31 are provided in the elastic breathable layer 32, and the outer covering layer 33 covers the elastic breathable layer 32. The outer covering layer 33 is used for contact with human skin.

As can be seen from the above description, the wearing comfort can be enhanced through the contact between the flexible cushion and the skin. It is to be noted that four through holes may or may not be provided in the outer covering layer 33, which may be selected according to the actual situation. If formed in the outer covering layer 33, the fourth through holes may be arranged in correspondence to and communicate with the third through holes 31. In practice application, the material of the outer covering layer 33 may be selected according to the actual situation. For example, the outer covering layer 33 may be made of breathable fabric (e.g. nylon mesh) or leather.

In one or more embodiments, the flexible cushion is of a composite structure of a sponge layer and a flexible layer.

As can be seen from the above description, the composite structure can provide a cushioning support to ensure the comfort during wearing.

In one or more embodiments, the flexible cushion is detachably connected to the main housing.

In one or more embodiments, the flexible cushion is magnetically connected to the main housing.

In practice application, for ease of installation, use, and subsequent cleaning and replacement, the flexible cushion is detachably connected to the main housing. The detachable connection may be made in a variety of ways. For example, the flexible cushion 3 may be detachably mounted onto the main housing 2 using magnetic suction, buckles, or Velcro. Definitely, in some embodiments, both ends of the flexible cushion 3 may also be detachably connected to the outer housing 1. In addition, the flexible cushion 3 may further include a mounting plate facing the main housing 2. The mounting plate is a plastic plate that is provided with corresponding fifth through holes, and the fifth through holes communicate with the third through holes 31.

Figure 2:
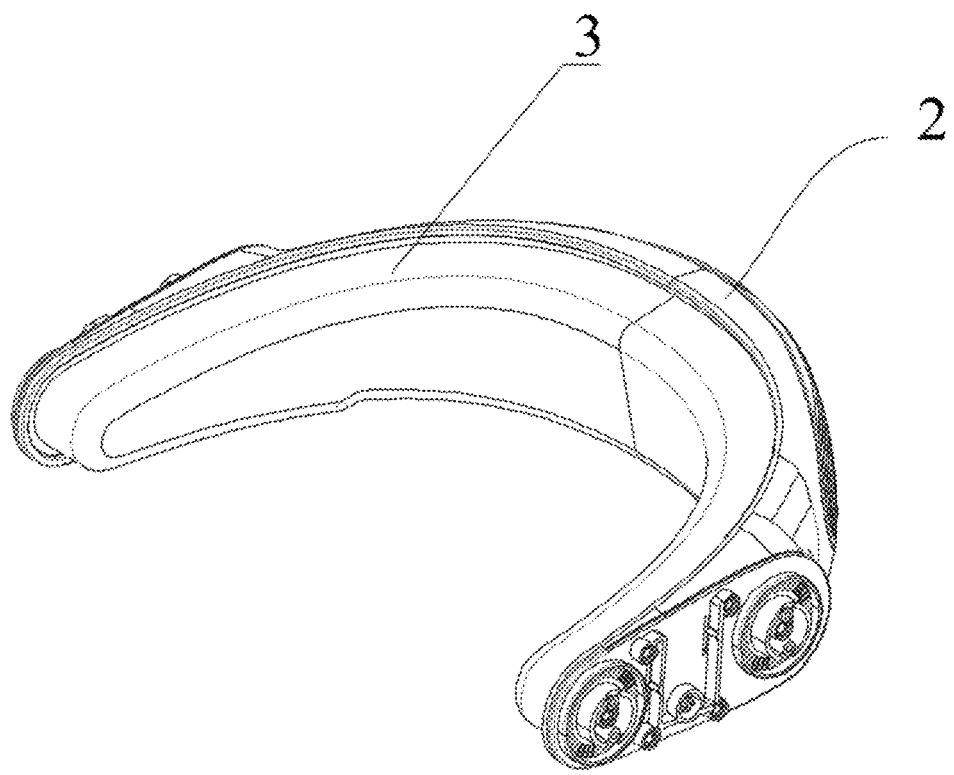
FIG. 2 is a schematic structural diagram of a head-mounted VR device described in this application from another perspective of one implementation.

Referring to FIGS. 1 to 13, a preferred embodiment of this application is: A head-mounted VR device, including a forehead band. As shown in FIGS. 1, 2, and 3, the forehead band includes an outer housing 1, a main housing 2, and a flexible cushion 3 that are connected sequentially from outside to inside. The outer housing 1 is disposed on an outer side face of the main housing 2. In some embodiments, a slot 24 is formed in the main housing 2, and the outer housing 1 is snapped in the slot 24. An air inlet 11 is formed in the outer housing 1, and an air grill 12 is provided in the air inlet 11. The air grill 12 includes a horizontal grill 121 or a vertical grill 122. In some embodiments, the air grill 12 has both the horizontal grill 121 and the vertical grill 122.

In some embodiments, as shown in FIGS. 6 and 7, the main housing 2 includes a first housing 22 and a second housing 25 that are connected to each other. The first housing 22 and the second housing 25 define a cavity 21, and a ventilating fan 4 is provided in the cavity 21. The second housing 25 includes a first housing portion 251, a second housing portion 252, and a third housing portion 253 that are snap-fit sequentially. In some embodiments, two heat dissipation structures are provided based on the above ventilating fan 4 to enhance the heat dissipation effect. These two heat dissipation structures are described in details as below.

Figure 13:
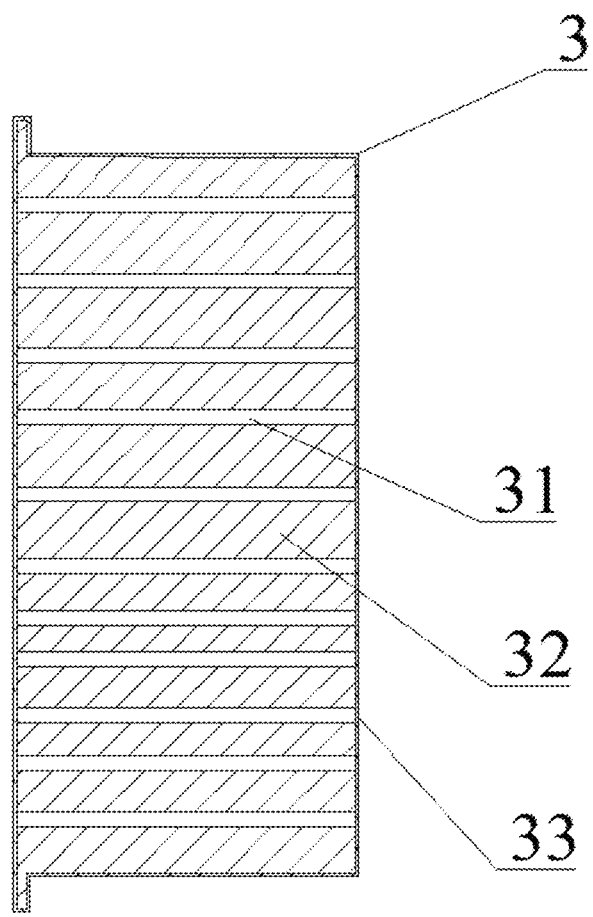
FIG. 13 is a cross-sectional view of a flexible cushion in a head-mounted VR device described in this application from a perspective of one implementation.

As shown in FIGS. 9 to 13, the first heat dissipation structure is specifically provided as follows: a first through hole 23 and second through holes 26 are formed in inner and outer sides of the main housing 2 respectively and communicate with the cavity 21. The first through hole 23 is provided in the first housing 22, and is disposed in correspondence to and communicates with the air inlet 11. A plurality of second through holes 26 are divided into three groups and are provided in the first housing portion 251, the second housing portion 252, and the second housing portion 253, respectively. Correspondingly, as shown in FIG. 13, the flexible cushion 3 includes an outer covering layer 33 and an elastic breathable layer 32. Third through holes 31 are formed in the elastic breathable layer 32, and are arranged in correspondence to and communicate with the second through holes 26. The outer covering layer 33 is used for contact with human skin. The ventilating fan 4 is mounted on the second housing portion 252 and extends from the second housing portion 252 into the first through hole 23. Based on the above structural configuration, it can be seen that the airflow channel of the first heat dissipation structure includes the air inlet 11, the first through hole 23, the second through holes 26, and the third through holes 31 sequentially from outside to inside. With the airflow channel, cooling and heat dissipation can be achieved in the areas where the forehead band is in contact with the skin. Specifically, the external air can enter the cavity sequentially through the air inlet 11 and the first through hole 23 based on the ventilating fan 4. Since the plurality of second through holes 26 are provided in the second housing 25 forming the cavity and communicate with the third through holes 31, the air blown into the cavity 21 can sequentially passes through the second through holes 26 and the third through holes 31, enabling direct airflow cooling and heat dissipation of the outer covering layer 33, thereby achieving direct cooling and heat dissipation to the areas where the forehead band is in contact with the skin.

In some embodiments, as shown in FIGS. 6 and 7, the second heat dissipation structure is specifically provided as follows: a first assembly gap is provided between the top of the first housing 22 and the top of the second housing 25 to form a first air outlet channel 27 that communicates with the cavity 21. A second assembly gap is provided between the bottom of the first housing 22 and the bottom of the second housing 25 to form a second air outlet channel 28 that communicates with the cavity 21. Based on the above structural configuration, the external air can enter through the air inlet 11, and the ventilating fan 4 blows the air entering through the air inlet 11 into the cavity 21. Since the first assembly gap is provided between the top of the first housing 22 and the top of the second housing 25 that constitute the cavity 21, and the second assembly gap is provided between the bottom of the first housing 22 and the bottom of the second housing 25, these gaps correspondingly form a first air outlet channel 27 and a second air outlet channel 28 that communicate with the cavity 21. In practical application, the first air outlet channel 27 can direct airflow upward for cooling, such as cooling the forehead, and the second air outlet channel 28 can direct airflow downward for cooling, such as cooling the face.

In summary, the head-mounted VR device provided in this application achieves active cooling by arranging the ventilating fan 4 and the multi-layer through-hole structure in the outer housing 1, the main housing 2, and the flexible cushion 3. In practical application, the ventilating fan 4 introduces the external airflow into the cavity 21 through the air inlet 11 and the first through hole 23, and directly directs cool air to contact areas between the outer covering layer 33 (i.e., the forehead band) and the forehead, face and the like of the user through the corresponding communication design of the first through hole 23, the second through holes 26, and the third through holes 31. This improves the heat dissipation efficiency significantly, reduces the feeling of stuffiness, and enhances the breathability and wearing comfort.

The above are merely embodiments of this application, and are not intended to limit the scope of patent of this application. Any equivalent modifications made based on the content of the specification and accompanying drawings of this application, or any direct or indirect applications in the relevant technical field, are all similarly included in the scope of protection of patent of this application.

What is claimed is:

1. A head-mounted VR device, comprising a main housing and a flexible cushion that are connected to each other, wherein a cavity is provided inside the main housing, a ventilating fan is provided inside the cavity, and a first through hole and second through holes are formed in inner and outer sides of the main housing respectively and communicate with the cavity; and third through holes are formed in the flexible cushion and are arranged in correspondence to and communicate with the second through holes, and the flexible cushion is used for contacting with human skin;
    the flexible cushion comprises an elastic breathable layer and an outer covering layer, the third through holes are provided in the elastic breathable layer, the outer covering layer covers the elastic breathable layer, and the outer covering layer is used for contacting with human skin.

2. The head-mounted VR device according to claim 1, wherein the main housing comprises a first housing and a second housing that are connected to each other, and the first housing and the second housing define the cavity.

3. The head-mounted VR device according to claim 2, wherein a first assembly gap is provided between the top of the first housing and the top of the second housing to form a first air outlet channel that communicates with the cavity.

4. The head-mounted VR device according to claim 3, wherein the first assembly gap is located at a side of the flexible cushion facing the top of a head of a wearer.

5. The head-mounted VR device according to claim 2, wherein a second assembly gap is provided between the bottom of the first housing and the bottom of the second housing to form a second air outlet channel that communicates with the cavity.

6. The head-mounted VR device according to claim 5, wherein the second assembly gap is located at a side of the flexible cushion facing the face of a wearer.

7. The head-mounted VR device according to claim 1, further comprising an outer housing, wherein an air inlet that communicates with the first through hole is formed in the outer housing.

8. The head-mounted VR device according to claim 7, wherein a slot is formed in the main housing, and the outer housing is snapped in the slot.

9. The head-mounted VR device according to claim 7, wherein an air grille is provided in the air inlet.

10. The head-mounted VR device according to claim 9, wherein the air grille comprises at least one of a horizontal grille and a vertical grille.

11. The head-mounted VR device according to claim 9, wherein the air grille is in the shape of a louver.

12. The head-mounted VR device according to claim 7, wherein the ventilating fan is fixedly mounted on the outer housing.

13. The head-mounted VR device according to claim 1, wherein the ventilating fan is fixedly mounted on the main housing.

14. The head-mounted VR device according to claim 1, wherein the outer covering layer is made of breathable fabric or leather.

15. A head-mounted VR device, comprising a main housing and a flexible cushion that are connected to each other, wherein a cavity is provided inside the main housing, a ventilating fan is provided inside the cavity, and a first through hole and second through holes are formed in inner and outer sides of the main housing respectively and communicate with the cavity; and third through holes are formed in the flexible cushion and are arranged in correspondence to and communicate with the second through holes, and the flexible cushion is used for contacting with human skin;
    the flexible cushion is detachably and magnetically connected to the main housing.

16. A head-mounted VR device, comprising a main housing and a flexible cushion that are connected to each other, wherein a cavity is provided inside the main housing, a ventilating fan is provided inside the cavity, and a first through hole and second through holes are formed in inner and outer sides of the main housing respectively and communicate with the cavity; and third through holes are formed in the flexible cushion and are arranged in correspondence to and communicate with the second through holes, and the flexible cushion is used for contacting with human skin;
    the main housing comprises a first housing and a second housing that are connected to each other, and the first housing and the second housing define the cavity;
    the second housing comprises a first housing portion, a second housing portion, and a third housing portion that are snap-fit sequentially, and the second through holes are formed in the first housing portion, the second housing portion, and the third housing portion.

17. The head-mounted VR device according to claim 16, wherein the ventilating fan is mounted on the second housing portion.

18. The head-mounted VR device according to claim 17, wherein the ventilating fan extends from the second housing portion into the first through hole.

* * * * *